No. 784,858. PATENTED MAR. 14, 1905.
C. H. HEPINSTALL.
COMBINED TYPE WRITER AND TELEGRAPH TRANSMITTER.
APPLICATION FILED FEB. 1, 1904.
3 SHEETS—SHEET 1.
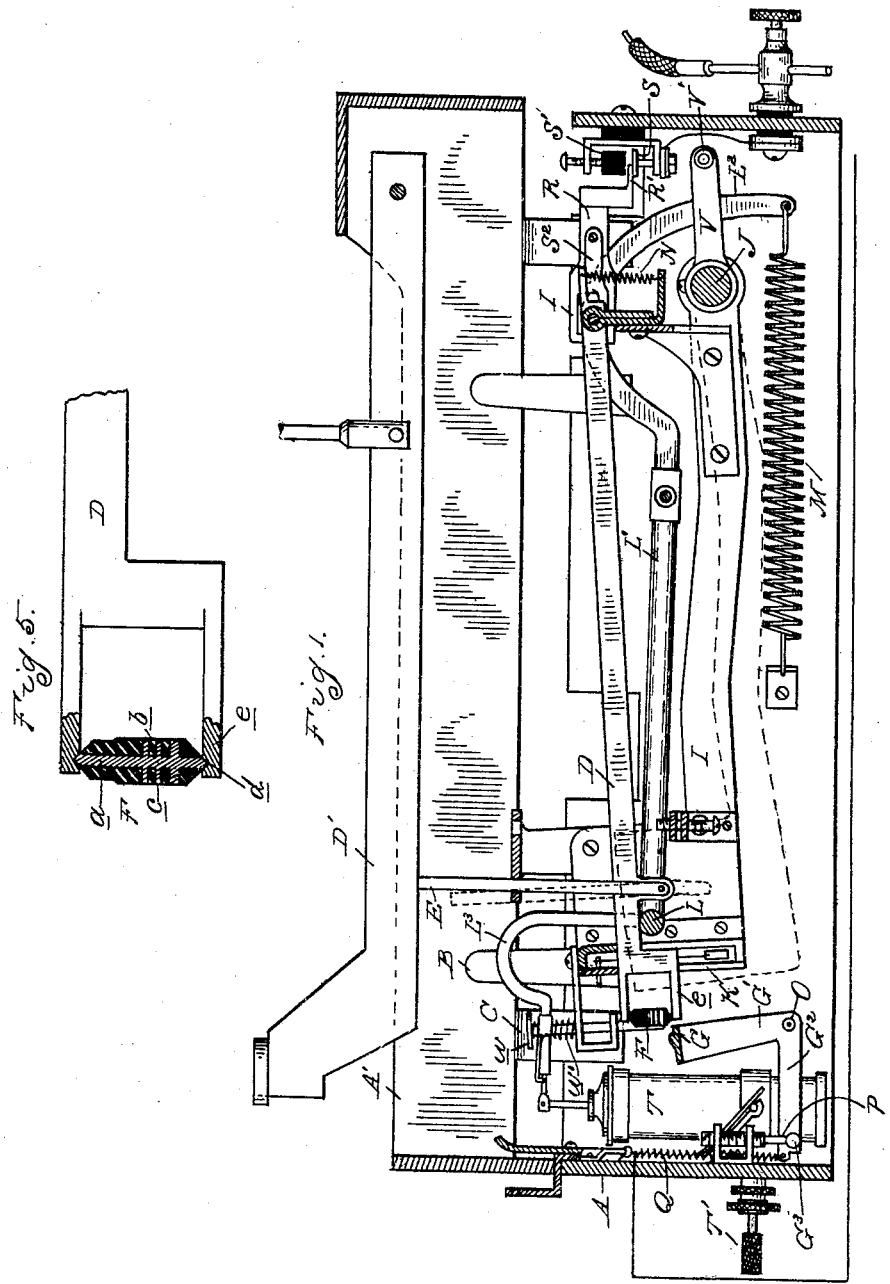
Witnesses
Geo. N. Grimm
Jas. P. Barry
Inventor
Cyrus H. Hepinstall
By James Whitemore
Atty.

No. 784,858. PATENTED MAR. 14, 1905.
C. H. HEPINSTALL.
COMBINED TYPE WRITER AND TELEGRAPH TRANSMITTER.
APPLICATION FILED FEB. 1, 1904.
3 SHEETS—SHEET 2.
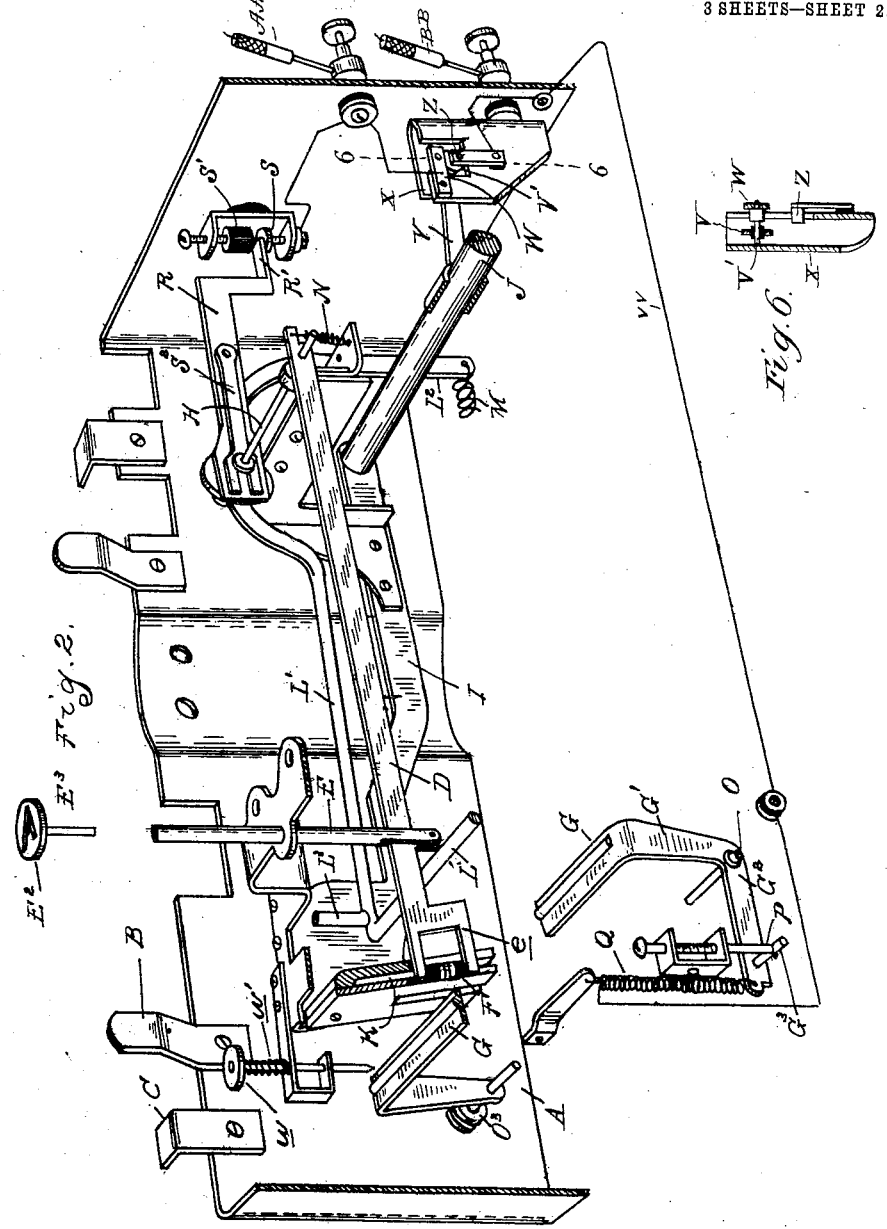

No. 784,858. PATENTED MAR. 14, 1905.
C. H. HEPINSTALL.
COMBINED TYPE WRITER AND TELEGRAPH TRANSMITTER.
APPLICATION FILED FEB. 1, 1904.
3 SHEETS—SHEET 3.
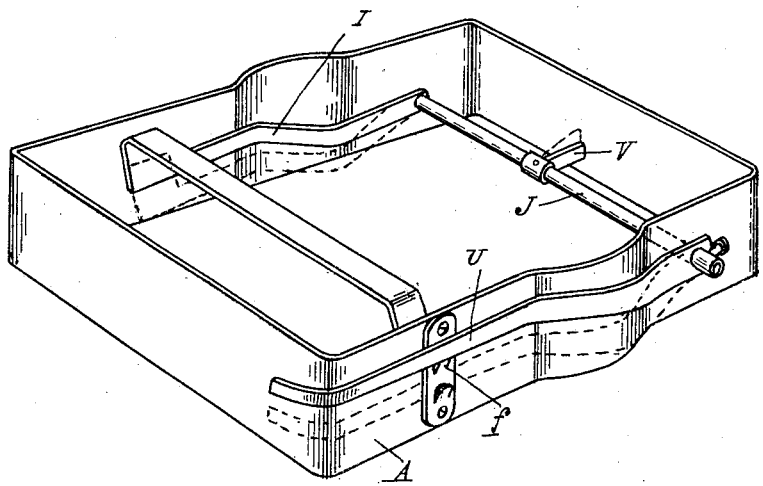
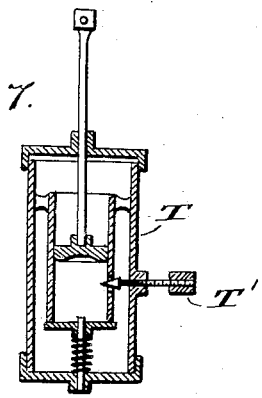
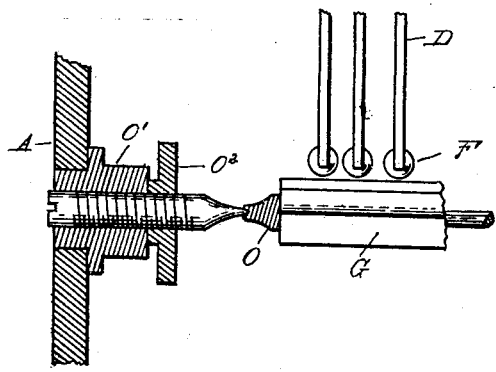

No. 784,858. Patented March 14, 1905.

UNITED STATES PATENT OFFICE.

CYRUS H. HEPINSTALL, OF ST. THOMAS, CANADA.

COMBINED TYPE-WRITER AND TELEGRAPH-TRANSMITTER.

SPECIFICATION forming part of Letters Patent No. 784,858, dated March 14, 1905

Application filed February 1, 1904. Serial No. 191,601.

*To all whom it may concern:*

Be it known that I, CYRUS H. HEPINSTALL, a subject of the King of Great Britain, residing at St. Thomas, in the Province of Ontario and Dominion of Canada, have invented certain new and useful Improvements in a Combined Type-Writer and Telegraph-Transmitter, of which the following is a specification, reference being had therein to the accompanying drawings.

The invention relates to instruments of that class intended for the simultaneous recording and transmitting of messages.

It is the object of the present invention to obtain a construction in which the electric transmitting mechanism is adapted for use in connection with a type-writer of usual construction, which may be quickly engaged or disengaged therefrom.

It is a further object to provide means for throwing the transmitter in or out of connection while still in engagement with the type-writer and for simultaneously closing the telegraph-circuit, so that messages may be received and recorded on the type-writer.

The invention consists in the construction as hereinafter set forth.

In the drawings, Figure 1 is a longitudinal section through the instrument. Fig. 2 is a sectional perspective view thereof. Fig. 3 is a perspective view of the base and the adjustable supporting-frame for the transmitting mechanism. Fig. 4 is a section illustrating the adjustment for the universal contact. Fig. 5 is a section through one of the interrupted contact members. Fig. 6 is a detail sectional view on line 6 6 of Fig. 2. Fig. 7 is a detail view, partly in section, of the dash-pot-adjusting means referred to hereinafter.

A is a suitable base, in which is arranged the mechanism constituting the electric transmitter. As shown, this base is in the form of a ring and is provided at its upper edge with guides B and supporting-lugs C for the engagement of the type-writer base. The transmitting mechanism comprises a series of key-levers D, corresponding in number to the number of characters or distinct signals to be transmitted. Each of these keys has connected therewith an upwardly-extending stem E, which is arranged to extend into the path of the corresponding key on the type-writer. Thus the depression of a type-writer key is adapted to simultaneously actuate the corresponding key D to move the same downward.

Each of the keys D carries an interrupted contact member F, which in the movement of the key is caused to travel over a coöperating contact G. The latter is in the form of a universal bar which is common to all of the interrupted contacts and is yieldingly pressed thereagainst.

The contacts F are preferably formed, as shown, of metallic cylinders $a$, which have formed therein grooves $b$, separating the cylinder into a series of rings $c$, which vary in width and in number according to the particular signal to be transmitted. The grooves in these cylinders are filled with insulating material, and the surface is then polished, so as to present a continuous bearing for the coöperating contact G. The ends of the cylinder $a$ are preferably tapered to a point and are engaged with sockets $d$, formed in a spring fork or bifurcation $e$ upon the lever D, the arrangement being such that the contacts F may be engaged or disengaged from the bifurcation of the lever or may be rotatably adjusted while in engagement.

The levers D are pivoted at their rear ends to a common fulcrum-bar H, which is supported on a frame I. The latter is pivotally secured upon the cross-bar J, supported in bearings in the base A. The frame I is also provided at its forward end with the guides K for each of the levers D. L is a universal bar which extends transversely beneath all of the levers D. This bar is secured to a rock-frame L′, which is pivoted, preferably, upon the fulcrum-bar H and is normally pressed upward against the keys by the tension of a spring M, connected to an extension $L^2$ beyond the fulcrum. This universal bar thus serves to normally support the keys D, and if any one of the latter is depressed the universal bar, actuated by the tension of the spring M, will return the same. Each of the keys D is, however, provided with the additional supporting means of a spring N, which serves to hold it in normal position when the universal bar is depressed by the actuation of another key.

The bar G, which forms the common contact for coöperating with each of the interrupted contacts F, is preferably connected by rock-arms G' with supporting-pivots O.

G$^2$ is an arm projecting forward from the arms G' and having a laterally-extending pin G$^3$, which extends into the path of an adjustable stop P on the frame A.

Q is a spring connected with the arm G$^2$ and serving to rock the arm G', so as to yieldingly press the universal contact-bar G against the interrupted contacts F, the movement being limited by the stop P.

R is an arm which is pivoted upon the fulcrum-bar H, adjacent to the frame L' of the universal bar L. This arm carries at its free end a movable contact R', which is arranged between a stationary contact S and an adjustable stop S'. The adjacent faces of the arm R and the frame L' are held in frictional contact, preferably by a spring S$^2$, with the result that whenever the universal bar is depressed by the actuation of one of the keys D it will cause the rocking of the frame L', the initial movement of which is transmitted, through frictional contact, to the rock-arm R. This will cause said rock-arm to be lifted slightly, so as to separate its contact R' from the coöperating stationary contact S. A further movement of the arm R and contact is, however, prevented by the stop S'. In the return movement of the universal bar L an opposite rocking movement will be imparted to the frame L', which will initially rock the arm R back into contact with the contact S'.

With the construction as thus far described the electric circuits are completed from the telegraph-line to the contact S, through the coöperating contact R', to the metallic fulcrum-bar and through the latter to each of the levers supported thereon. These levers are in electric connection with the cylinder $a$, the metallic ends of which engage with bearings in the bifurcation $e$, and thus each of the ring-contacts $c$ will be in electric connection with the line. Upon the depression of one of the levers its contact member F will be caused to travel over the universal contact-bar G, so as to successively contact the rings $c$ with said bar. This movement will not, however, complete the electric circuit, for the reason that in the initial movement of the lever the bar L will be depressed, rocking the frame L' and through frictional engagement the arm R, so as to withdraw the contact R' from the contact S and break the circuit in advance of the contact of the member F with the universal contact G. The contacts R' and S are maintained separate until the downward movement of the lever D is completed; but as soon as the lever is released and begins to rise an opposite rocking movement will be imparted to the arm R, which will initially close the contact R' against the contact S. This will complete the electric circuit at that point and permit the ring $c$ on the contact F to successively complete the circuit between said member F and the contact-bar G. The latter bar being electrically connected with the ground or return circuit, it is evident that a succession of electric impulses will be transmitted by the passage of the contact member F upward over the bar G.

It has been already stated that the levers D are depressed by the corresponding key-levers of the type-writer. Inasmuch, however, as the upward movement of the levers D is effected by the tension of the spring M operating through the universal bar L, it is necessary to provide means for governing the upward movement of said bar in order that the signals may not be transmitted more rapidly than they can be received at the opposite end of the line. For governing this action a retarding device is provided, which, as shown, comprises the dash-pot T, containing oil or other fluid, a piston in said dash-pot, and means for restricting the flow of oil from one side to the other of said piston during its movement in the dash-pot. The piston is connected to an arm L$^3$, connected to the universal bar L, and an adjustable means is provided for varying the restriction in the dash-pot, such as the adjusting-screw T'. Thus in operation by adjusting the screw T' the upward movement of the piston in the dash-pot may be regulated, and the latter will control the movement of the universal bar L, which returns the keys D, so as to regulate the speed with which the signals are transmitted The instrument as described is adapted for use in the simultaneous transmission of messages and writing of the same upon the type-writer. It is desirable, however, to use the same type-writer for writing the messages received as well as the messages transmitted. I have therefore provided means by which the transmitting mechanism may be lowered out of operative relation to the keys of the type-writer. This, as shown, comprises the lever U, arranged at one side of the base A and connected with the frame I, which supports the levers D. This lever is normally held in its raised position by engagement with the stop $f$ on the side of the base A, but may be disengaged from said stop by springing the same laterally. When disengaged, the lever may be depressed, which permits the frame I to drop downward until the stems E are withdrawn from the path of the key-levers of the type-writer. At the same time the telegraph-circuit is closed, so as to permit the receiving instrument to be operated in receiving messages from the other end of the line. This closing of the circuit may be effected by a rock-arm V, secured to the axle A, which carries at its outer end a contact-plug V', slidably engaging the walls of the U-shaped plate X, secured to the frame A and having connected thereto the insulated contacts W and Z, extending inwardly through slotted portions of the plate X and adapted to be alternately connected with the contact-plug B'. The movement of the axle J causes the rear end of the arm V to move upward when the transmitter is lowered out of operative contact with the keys and downward when raised into its operative contact, one end of the plug V' constantly contacting with the plate X and the opposite end alternately connecting with the contacts W and Z. Following the circuit when the arm V is raised (and the transmitter lowered out of operative contact with the keys of the type-writer) the circuit follows lines through A A to W, thence through plug V' to X. When, on the other hand, the arm V is lowered, (and the transmitter is adjusted into operative contact with the type-writer,) the circuit follows lines through A A, U U, S, R, D, G, Q, V V, and Z, thence through plug V' to X.

The construction being as shown and described, in operation the type-writer, such as A', may be placed in position above the frame A, being held thereon by the guides B and supported by the lugs C. In this position each of the key-levers D' of the type-writer is in proximity to one of the stems E of the levers D. The operator may then manipulate the keys of the type-writer in the ordinary manner to write out the message, with the result that as each key is depressed the corresponding lever D will be depressed, moving the interrupted contact F over the contact-bar G.

As has been stated, the initial movement of the levers D will cause the breaking of the contact R' from the contact S, so that the electric circuit is open during the passage of the contact F over the contact G. The return movement will initially close the contacts R' and S, so that in the passage of the interrupted contact F over the contact-bar G there will be a predetermined succession of make and breaks in the electric circuit.

When the operator desires to receive the message, the lever U is disengaged from the contact $f$ and lowered to depress the frame I, which will carry all of the stems E out of operative relation to the key-levers D' of the type-writer. At the same time the movement of the rock-arm V will cause the contact V' to close with the contact W, which will complete the electric circuit. The message may then be received on the ordinary receiver and written down on the type-writer.

Should the operator desire to send any signal not indicated by one of the keys of the instrument, he may do so by using a finger-key $w$, arranged at one side of the keyboard, which on being depressed contacts with the contact G to close the circuit. This key is normally held in raised position by the tension of a spring $w'$, where it is out of contact with the bar G.

Should any of the contacts F become worn through use, by slightly rotating the contact a new line of bearing on the coöperating contact G is given. Should the bar G itself become worn, it may be adjusted by shifting the pivots O laterally, and this may be accomplished by forming said pivots with a screw-thread engagement with bearings O' on the base A, a lock-nut O² serving to lock the pivots in different positions of adjustment.

Where it is desired to use the instrument as a signal-transmitter without the employment of a type-writer, this may be done by engaging detachable finger-tips E' with each of the stems E, said stems being provided with sockets E² in their ends and the tips E' having shanks E³ for engaging said sockets.

What I claim as my invention is—

1. In an electric signal-transmitter the combination with a contact member of a coöperating interrupted contact member comprising a metallic cylinder having annular grooves therein filled with insulating material, and means for moving said cylinder axially over the other contact.

2. The combination with a base having bearings thereon for positioning and supporting a type-writer, of a signal-transmitter within said base, a series of interrupted contacts and coöperating contacts each arranged below the keys and adapted to be reciprocated by the corresponding key of the type-writer to transmit a predetermined succession of electric impulses, and means for simultaneously throwing the whole series of interrupted contacts in or out of mechanical actuating connection with said type-writer.

3. In a signal-transmitter the combination with an interrupted contact, a lever, a coöperating contact at one end of said lever adapted for relative reciprocation, to transmit a predetermined succession of electric impulses, of means for opening the electric circuit by the initial movement of the reciprocatory contact in one direction, and for closing said circuit by the initial movement in the opposite direction whereby one series only is transmitted during the reciprocation.

4. In a signal-transmitter, the combination with a series of interrupted contacts, and a universal coöperating contact adapted for relative reciprocation to transmit a predetermined succession of electrical impulses, of independent means operating upon the initial movement of each of said contacts in one direction to open the electric circuit, and operating upon the initial movement of said contacts in the opposite direction to close said circuit.

5. In a signal-transmitter, the combination with a series of reciprocatory interrupted contacts, and a universal coöperating contact of a universal bar mechanically actuated upon the movement of any one of said contacts, a circuit-closer operated by the initial movement of said universal bar to open the electric circuit, and actuated the initial by return movement of said bar to close said circuit.

6. In a signal-transmitter, the combination with a series of levers of an interrupted contact carried by each lever, and a universal coöperating contact over which said interrupted contact is adapted to travel in the movement of the lever to transmit a predetermined succession of electric impulses, of a universal bar actuated by the depression of any one of said levers, a contact frictionally actuated by said universal bar, and a coöperating contact, and a stop between which said contact is reciprocated in the movement of said bar whereby the electric circuit is broken on the initial depression of each of said levers, and is closed upon the initial return movement thereof.

7. In an electric signal-transmitter, the combination of an interrupted contact, a coöperating contact adapted for relative reciprocation, said contact being adjustable laterally of the direction of reciprocation to alter the line of contact, and means for limiting said lateral movement.

8. An electric signal-transmitter the combination of an interrupted contact and a coöperating contact adapted for relative reciprocation, the one being rotatably adjustable in relation to the other to alter the line of contact.

9. In an electric signal-transmitter the combination of an interrupted and coöperating contact adapted for relative reciprocation one of said contacts being rotatably adjustable and the other contact being adjustable laterally of the direction of reciprocation whereby the line of contact may be changed.

10. In an electric signal-transmitter, the combination with a contact member, of a coöperating interrupted contact member comprising a cylinder movable axially over the other contact and formed of conducting material, having annular grooves therein for forming interruptions, said cylinder being rotatably adjustable to change the line of contact.

11. In an electric signal-transmitter the combination with a contact member of a coöperating interrupted contact member comprising a metallic cylinder having annular grooves therein filled with insulating material and means for moving said cylinder axially over the other contact permitting of a rotative adjustment of the cylinder to alter the line of contact.

12. In a signal-transmitter the combination with a bifurcated lever of a cylindrical contact member journaled at its opposite ends in the bifurcations of said lever adapted to travel axially in the movement of said lever, said cylinder being provided with a series of annular grooves forming interruptions in the surface thereof, and a coöperating contact over which said cylinder is drawn in the movement of the lever.

13. In a signal-transmitter the combination of a lever D having the end e of the interrupted contact F having the annular grooves b therein to form a series of contact-rings c the ends of said cylinder being rotatively secured in the furcations of the lever.

14. In a signal-transmitter, the combination of a series of signal-transmitting levers having upwardly-extending hollow stems adapted to be operated by corresponding key-levers of a superimposed type-writer, means for spacing said key-levers from said stems, and a series of detachable finger-tips for engagement with said stems after said spacing operation.

15. In an electric signal-transmitter, the combination with a contact member, of a coöperating interrupted contact member, including a rotatably-adjustable cylindrical member movable axially over the other contact.

16. In an electric signal-transmitter, the combination with an adjustable contact member, of a coöperating interrupted contact member including a rotatable adjustable cylindrical member movable axially over the other contact.

17. In an electric signal-transmitter, the combination with a contact member, of a lever, and a coöperating interrupted contact member, comprising a rotatably-adjustable cylindrical member, detachably connected to said lever and movable axially over the complementary contact.

18. In a combined type-writer and electric transmitter, the combination with operating-keys for the type-writer, of a transmitter therebelow, including a plurality of levers having upwardly-extended stems intermediate their ends in line with the several type-writer keys and adapted to be actuated thereby, a contact at one end of the levers adapted to be reciprocated across the path of a universal contact, and an electric connection operatively associated with the opposite end of said levers.

19. In a combined type-writer and transmitter, the combination with operating-keys for the type-writer, of a transmitter therebelow including a plurality of levers having upwardly-extended stems intermediate their ends in line with the several type-writer keys and adapted to be vertically reciprocated thereby, a laterally-adjustable universal contact arranged in the path of one end of the levers and coöperating contacts at the adjacent ends of said levers.

20. In a combined type-writer and transmitter, the combination of operating-keys for the type-writer, a transmitter therebelow, including a plurality of levers having upwardly-extended stems intermediate their ends in line with the several keys, and adapted to be actuated thereby, and means whereby all of said stems may be simultaneously spaced below and out of operating engagement with said keys.

21. In a combined type-writer and transmitter, the combination with operating-keys for the type-writer, of a transmitter therebelow, including a plurality of levers having upwardly-extended stems intermediate their ends in line with the several keys, and adapted to be actuated by the latter, means whereby all of said stems may be simultaneously spaced below and out of operative engagement with said keys, and complementary detachable keys for said stems for operating the same after being spaced below the key connections.

In testimony whereof I affix my signature in presence of two witnesses.

CYRUS H. HEPINSTALL.

Witnesses:
   JAMES B. HILL,
   C. V. MARTIN.